United States Patent
Paulraj et al.

(10) Patent No.: US 10,133,651 B2
(45) Date of Patent: Nov. 20, 2018

(54) SOFTWARE DEFECT ANALYSIS TOOL

(71) Applicant: Bank of America Corporation, Charlotte, NC (US)

(72) Inventors: Samson Paulraj, Telangana (IN); Chandrashekhar Radhakrishnan, Telangana (IN); Jyothi Lloyd Leslie, Telangana (IN); Mudit Chawla, Haryana (IN); Mahendran Vella Pandian, Tamilnadu (IN)

(73) Assignee: Bank of America Corporation, Charlotte, NC (US)

(*) Notice: Subject to any disclaimer, the term of this patent is extended or adjusted under 35 U.S.C. 154(b) by 37 days.

(21) Appl. No.: 15/383,694

(22) Filed: Dec. 19, 2016

(65) Prior Publication Data
US 2018/0173608 A1    Jun. 21, 2018

(51) Int. Cl.
*G06F 11/36* (2006.01)
*G06F 11/30* (2006.01)
*G06F 11/34* (2006.01)

(52) U.S. Cl.
CPC ........ *G06F 11/3612* (2013.01); *G06F 11/302* (2013.01); *G06F 11/3409* (2013.01); *G06F 11/3664* (2013.01)

(58) Field of Classification Search
CPC ............. G06F 11/3612; G06F 11/3664; G06F 11/302; G06F 11/3409
USPC ........................................................ 717/127
See application file for complete search history.

(56) References Cited

U.S. PATENT DOCUMENTS

| | | | | |
|---|---|---|---|---|
| 7,337,124 B2* | 2/2008 | Corral | ................... | G06Q 10/06 717/101 |
| 7,917,897 B2* | 3/2011 | Bassin | ................ | G06F 11/3604 717/126 |
| 7,966,612 B2* | 6/2011 | D'Alterio | ................. | G06F 8/61 717/168 |
| 8,151,248 B1* | 4/2012 | Butler | ................. | G06F 11/3692 717/124 |
| 8,214,798 B2 | 7/2012 | Bellucci et al. | | |
| 8,336,030 B1* | 12/2012 | Boissy | ...................... | G06F 8/71 717/122 |
| 8,924,935 B1* | 12/2014 | Chopra | ..................... | G06F 8/71 717/120 |

(Continued)

OTHER PUBLICATIONS

Yu, "A Software Fault Prevention Approach in Coding and Root Cause Analysis", Apr. 1998, Bell Labs Technical Journal.*

(Continued)

*Primary Examiner* — Wei Y Zhen
*Assistant Examiner* — Junchun Wu
(74) *Attorney, Agent, or Firm* — Michael A. Springs

(57) ABSTRACT

A software defect detection tool determines a modification in a software code at a first time and analyzes an execution of the software code to detect a performance issue at a second time. The software defect detection tool detects a defect in the software code by a comparison of the first time and a second time. A software defect analysis tool generates a cause/category combination for a software code defect. The software defect analysis tool determines whether the cause/category combination is an approved combination and whether the software code defect is a false positive. The software defect analysis tool generates a corrective action plan indicating measures to implement to reduce software defects.

12 Claims, 5 Drawing Sheets

(56) References Cited

U.S. PATENT DOCUMENTS

| | | | |
|---|---|---|---|
| 9,176,729 B2 | 11/2015 | Mockus et al. | |
| 9,195,566 B2 | 11/2015 | Huang et al. | |
| 2004/0163016 A1* | 8/2004 | Kim | H04L 41/0213 |
| | | | 714/47.1 |
| 2005/0125770 A1* | 6/2005 | Arsenault | G01C 15/002 |
| | | | 717/104 |
| 2008/0201612 A1* | 8/2008 | Bassin | G06F 11/3616 |
| | | | 714/38.13 |
| 2009/0313505 A1* | 12/2009 | McCroskey | G06F 11/006 |
| | | | 714/37 |
| 2010/0023928 A1* | 1/2010 | Hentschel | G06F 8/70 |
| | | | 717/124 |
| 2010/0174691 A1* | 7/2010 | Caldwell | G06F 17/30598 |
| | | | 707/696 |
| 2011/0258609 A1* | 10/2011 | Maczuba | G06F 11/0778 |
| | | | 717/128 |
| 2012/0029679 A1* | 2/2012 | Matsushita | H01L 22/20 |
| | | | 700/110 |
| 2012/0117544 A1* | 5/2012 | Kakulamarri | G06F 11/3612 |
| | | | 717/126 |
| 2012/0317554 A1* | 12/2012 | Mulat | G06F 11/3608 |
| | | | 717/131 |
| 2013/0290938 A1* | 10/2013 | Nir | G06F 11/3672 |
| | | | 717/130 |
| 2015/0331780 A1* | 11/2015 | Huang | G06F 11/362 |
| | | | 717/131 |
| 2017/0277583 A1* | 9/2017 | Mohandoss | G06F 11/079 |
| 2018/0004648 A1* | 1/2018 | Kidron | G06F 11/3692 |

OTHER PUBLICATIONS

Leszak et al., "Classification and evaluation of defects in a project retrospective", 2002, Elsevier Science Inc.*

Kumaresh et al., "Defect Analysis and Prevention for Software Process Quality Improvement", Oct. 2010, International Journal of Computer Applications, vol. 8, No. 7.*

Leszak et al., "A Case Study in Root Cause Defect Analysis", 2000, ACM.*

* cited by examiner

SOFTWARE DEFECT ANALYSIS TOOL

TECHNICAL FIELD

This disclosure relates generally to detecting and analyzing software defects and improving software code quality.

BACKGROUND

Software developers create software code. For example, software developers create new applications, new versions of applications, and software patches. Software code may contain defects that cause the software code to execute improperly.

SUMMARY OF THE DISCLOSURE

According to an embodiment, a software defect detection tool includes a retrieval engine, a code analysis engine, a performance analysis engine, and an aggregation engine. The retrieval engine receives a request to monitor a performance of a software code. The retrieval engine retrieves the software code in response to the request. The code analysis engine determines a modification in the software code by comparing the received software code to a prior version of the software code. The code analysis engine determines a first time at which the software code was modified. The performance analysis engine analyzes an execution of the software code in real time. The performance analysis engine detects an anomaly indicating a performance issue with the software code. The performance analysis engine determines a second time at which the anomaly is detected. The aggregation engine receives the first time and the second time. The aggregation engine detects a defect in the software code based on a comparison of the first time and the second time.

According to another embodiment, a method includes receiving a request to monitor a performance of a software code. The method further includes retrieving the software code in response to the request. The method further includes determining a modification in the software code by comparing the received software code to a prior version of the software code. The method further includes determining a first time at which the software code was modified. The method further includes analyzing an execution of the software code in real time. The method further includes detecting an anomaly indicating a performance issue with the software code. The method further includes determining a second time at which the anomaly is detected. The method further includes receiving the first time and the second time. The method further includes detecting a defect in the software code based on a comparison of the first time and the second time.

According to yet another embodiment, a software defect analysis tool includes a network interface, an extraction engine, an analysis engine, and a reporting engine. The network interface receives defect information for a defect in a software code. The defect information includes a defect category indicating that the defect is one of a plurality of defect categories. The defect information includes a defect cause indicating a cause of the defect. The defect information includes developer information indicating a developer of the software code. The extraction engine determines the defect cause, the defect category and the developer. The analysis engine generates a cause/category combination, the cause/category combination comprising the defect cause and the defect category. The analysis engine determines whether the cause/category combination is an approved cause/category combination by comparing the cause/category combination to a plurality of predetermined approved cause/category combinations. Upon a determination that the cause/category combination is not an approved cause/category combination, the analysis engine communicates a request to the developer to update at least one of the defect cause and the defect category as per the approved cause/category combination. The reporting engine generates a corrective action plan base on the root cause identified by the developer. The corrective action plan indicating measures to implement to reduce software defects.

According to yet another embodiment, a method includes receiving defect information for a defect in a software code. The defect information includes a defect category indicating that the defect is one of a plurality of defect categories. The defect information includes a defect cause indicating a cause of the defect. The defect information includes developer information indicating a developer of the software code. The method further includes determining the defect cause, the defect category, and the developer. The method further includes generating a cause/category combination. The cause/category combination includes the defect cause and the defect category. The method further includes determining whether the cause/category combination is an approved cause/category combination by comparing the cause/category combination to a plurality of predetermined approved cause/category combinations. The method further includes communicating a request to the developer to update at least one of the defect cause and the defect category upon a determination that the cause/category combination is not an approved cause/category combination and also to update the root cause. The method further includes generating a corrective action plan, the corrective action plan indicating measures to implement to reduce software defects.

Certain embodiments provide one or more technical advantages. For example, an embodiment eliminates or reduces defects in software code. This improves the quality of software code. In certain embodiments eliminating or reducing software code defects allows software code to execute properly. In some embodiments, eliminating or reducing software code defects allows software code to execute more efficiently. For example, reducing software code defects improves processing speed by ensuring that the software code is processed properly. As another example, reducing defects in software code reduces memory usage. For example, reducing software code errors reduces memory leaks in some embodiments.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
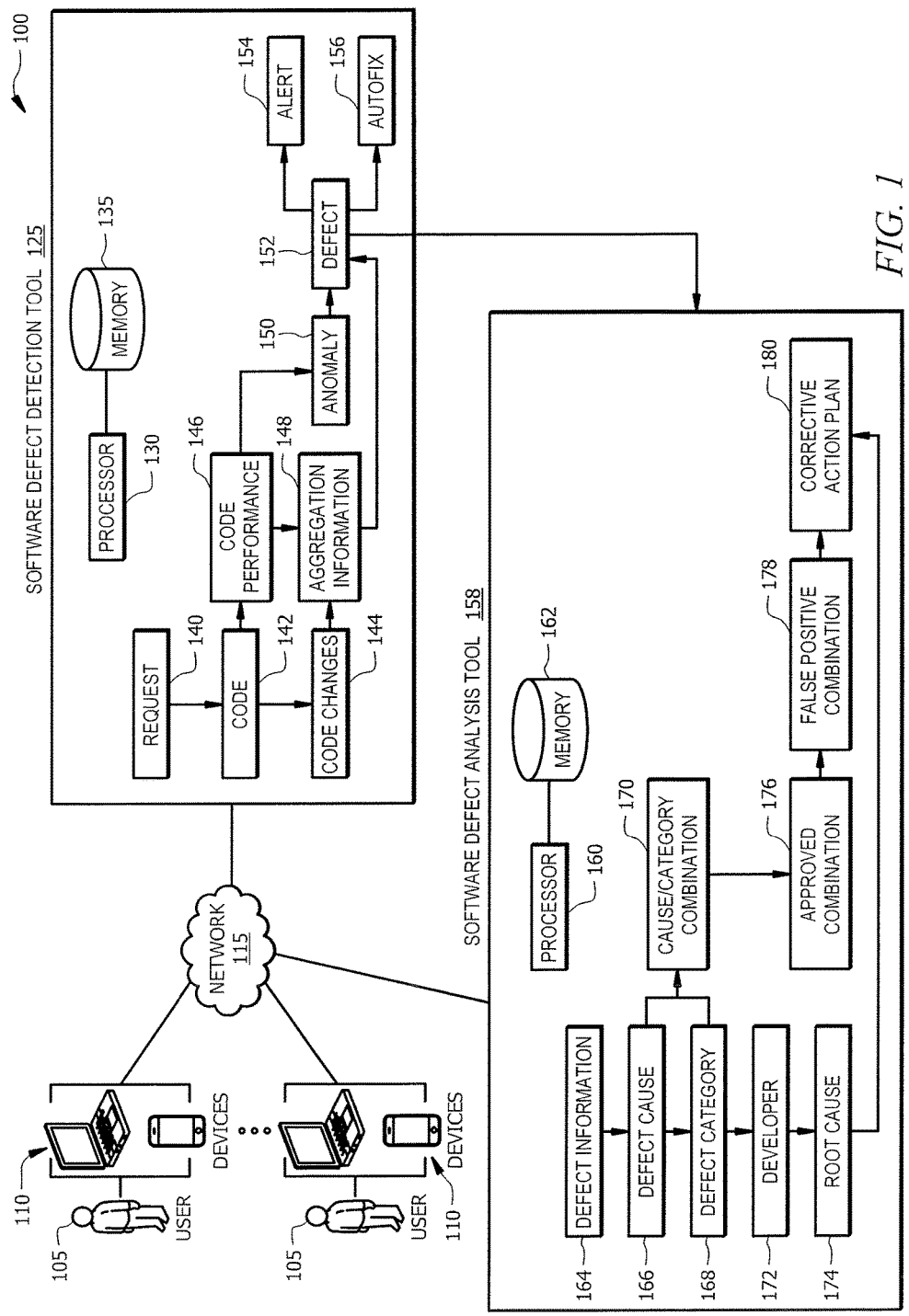
FIG. 1 illustrates a system for software code defect detection and analysis.

Embodiments of the present disclosure and its advantages are best understood by referring to FIGS. 1 through 5 of the drawings, like numerals being used for like and corresponding parts of the various drawings.

Software developers create software code. For example, software developers create new applications, new versions of applications, and software patches. Software code may contain defects that cause the software code to execute improperly. Developing and executing software code presents several technical challenges. Errors in software code may not surface immediately after executing software code. This presents the technical challenge of identifying an error in software code. Once an error is identified, the error may be categorized. Categorizing errors facilitates determining causes of errors. This allows software developers to reduce or eliminate code errors.

Software errors may be improperly categorized. For example, software errors may be improperly categorized due to human error. As another example, software errors may be improperly categorized by computers with limited categorization technology. Error categorization facilitates determining error causes. Error categorization facilitates reducing future errors by identifying proactive measures to reduce or eliminate error causes. Improperly categorized errors reduce the likelihood of successfully correcting the errors and reducing future errors.

Errors may be false positives. A false positive is an identified software error that is not an error. A human and/or a machine may incorrectly identify a piece of software code as including an error. False positives reduce the efficiency of reducing and eliminating errors. For example, false positives may lead to preventative measures that are unneeded. As another example, a machine may attempt to automatically correct a false positive. This leads to using unneeded processing power to attempt to correct software code that does not have an error. Further, a machine may create a software error while attempting to correct a false positive. False positives waste computer resources and can lead to an increased number of software errors.

This disclosure contemplates a software defect detection tool that identifies errors in software code to facilitate reducing or eliminating the errors. The software defect detection tool monitors changes in software code and the performance of the software code. For example, the software defect detection tool may monitor a processing usage, a memory usage, and/or a network bandwidth usage expended to execute software code. As another example, the software defect detection tool may monitor the execution of the software code for application failures. If the software defect detection tool determines that the execution of the software code is underperforming, the software defect detection tool determines a software error by determining the change in the software code that caused the execution of the software code to underperform. The software defect detection tool facilitates correcting software errors by communicating a command to automatically correct the error and/or communicating an alert to a software developer.

This disclosure further contemplates a software defect analysis tool. The software defect analysis tool categorizes errors in universal way to facilitate generating a corrective action plan to reduce future software errors. The software defect analysis tool facilitates a universal logging of software coding errors. A universal logging system allows the software defect analysis tool to generate a corrective action plan. For example, by using a universal logging system, the software defect analysis tool may analyze the most prevalent root cause for the software code error and generate a plan to reduce the errors. The software defect analysis tool may automatically communicate software coding errors to software developers responsible for the code. The software developers may revise the software code to remove errors. The software defect analysis tool receives a software coding error. For example, the software defect analysis tool receives an error from the software defect detection tool. The software defect analysis tool determines a category and cause combination of the errors. The software defect analysis tool determines whether the category and cause combination is consistent with a universal logging system. The software defect analysis tool uses the category and cause to additionally determine whether the error is a false positive. If the error is not a false positive the software defect analysis tool communicates the error to a software developer to be corrected. The software defect analysis tool generates a corrective action plan based on the errors that indicates measures to implement to reduce software errors.

In this disclosure, the terms software defect, software error, coding error, coding defect, error, and defect are used interchangeably and each refer to an error in a piece of software code that causes the code to operate in an unintended manner.

FIG. 1 illustrates a system 100 for software code defect detection and analysis. As illustrated in FIG. 1, system 100 includes users 105, devices 110, network 115, software defect detection tool 125, and software defect analysis tool 158. In particular embodiments, system 100 reduces or eliminates software code defects.

Devices 110 may be any devices that operate and/or communicate with other components of system 100. In general, devices 110 communicate a request to monitor software code performance. For example, devices 110 communicate request 140 to software defect detection tool 125 or any other suitable component of system 100. Devices 110 may communicate software code to software defect detection tool 125 for analysis. In some embodiments, devices 110 receive corrective action plan 180 from software defect analysis tool 158. Devices 110 may be associated with a software developer or group of software developers.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Software code may comprise defects. For example, software code may include keystroke errors. As another example, software code may include logic errors and/or run time errors. This disclosure contemplates a software code defect including any type of coding defect. Software code may render executing software code impossible. For example, a machine executing may be unable to compile and/or run the software code. As another example, software code errors may cause the software code to be executed inefficiently, using unneeded processing and/or memory resources. System 100 generally facilitates correcting, analyzing, and correcting software code errors.

Software defect detection tool 125 determines defects in software code and facilitates correcting software errors to reduce or eliminate errors in software code. Software defect detection tool 125 generally collects and analyzes real-time performance data from the execution of software code and correlates the data to a root cause by continuously tracking the changes and/or configurations of the software code. As illustrated in FIG. 1, software defect detection tool includes processor 130 and memory 135. This disclosure contemplates processor 130 and memory 135 being configured to perform any of the operations of software defect detection tool 125 described herein. In particular embodiments, software defect detection tool 125 reduces or eliminates software coding errors.

Processor 130 is any electronic circuitry, including, but not limited to microprocessors, application specific integrated circuits (ASIC), application specific instruction set processor (ASIP), and/or state machines, that communicatively couples to memory 135 and controls the operation of software defect detection tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory 135 and executes them by directing the coordinated operations of the ALU, registers and other components. Processor 130 may include other hardware and software that operates to control and process information. Processor 130 executes software stored on memory 135 to perform any of the functions described herein. Processor 130 controls the operation and administration of software defect detection tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 may store software code 142, code changes 144, and/or any other suitable information to operate software defect detection tool 125.

In an exemplary embodiment, software defect detection tool 125 receives a request 140. Request 140 may indicate a request to monitor for errors in software code 142. Request 140 may indicate software code 142 stored in devices 110, memory 135, memory 162, and/or any other suitable component of system 100.

In response to receiving request 140, software defect detection tool 125 may retrieve a software code 142. For example, software defect detection tool 125 may retrieve software code 142 from devices 110 and/or any other suitable component of system 100. Generally, software code 142 is software code that is executed using one or more computing machines. As discussed, software code 142 may include errors that cause software code 142 to execute and/or perform in an unintended manner.

Software defect detection tool 125 may monitor changes in software code 142 to generate code changes 144. Code changes 144 generally indicates modifications in software code 142. For example, software defect detection tool 125 may dynamically receive updates to software code 142 and analyze updated code to gather real-time data of configuration changes, module changes, feature changes, and/or coding changes to software code 142. Software defect detection tool 125 may generate code changes 144 by continually monitor the changes in an environment with reference to a timeline of when the changes occurred.

Software defect detection tool 125 uses software code 142 to generate code performance 146. Code performance 146 generally indicates whether software code 142 is executing properly. Software defect detection tool 125 generates code performance 146 by monitoring the execution of software code 142. Software defect tool 125 monitors software code 142 execution for performance issues to generate code performance 146. For example, software defect tool 125 monitors memory usage, central processing unit ("CPU") usage, disk space usage, number of processes, active listeners, buffer cache, average read/write times, input/output wait times, packets transmitted per second, interface status, response time, bytes per session, stall count, heap usage, and/or thread usage. Software defect detection tool 125 may monitor for application failures to generate code performance 146.

Software defect detection tool 125 aggregates code changes 144 and code performance 146 to generate aggregation information 148. Aggregation information 148 generally facilitates identifying changes in software code 142 that caused performance issues. Aggregation information 148 places code changes 144 and code performance 146 on a common timeline. In this way, aggregation information 148 indicates how one or more code changes 144 affected code performance 146.

Software defect detection tool 125 detects anomaly 150 using code performance 146. Anomaly 150 generally indicates that the execution of software code 142 is experiencing performance issues. For example, the execution of software code 142 may be expending more than a predetermined amount of memory usage, CPU usage, and/or disk space usage. As another example, anomaly 150 may indicate that executing software code 142 requires greater than a predetermined number of processes, active listeners, buffer cache percentage, read/write times, input/output wait times, packets transmitted per second, response time, bytes per session, stall counts, heap usage, and/or thread usage. As yet another example, anomaly 150 may indicate a greater than a predetermined number of application failures.

Software defect detection tool 125 identifies defect 152 using anomaly 150 and aggregation information 148. Defect 152 is generally an error in software code 142 that causes anomaly 150. Software defect detection tool 125 identifies the presence of defect 152 using anomaly 150 as discussed. Software defect detection tool 125 determines the cause of anomaly 150 using aggregation information 148. For example, if software defect detection tool 125 determines anomaly 150 upon a determination that CPU usage is above a predetermined amount, software detect detection tool 125 uses aggregation information 148 to determine a time that the CPU usage increased above a predetermined amount. Software defect detection tool 125 parses aggregation information 148 to determine a code change 144 that occurred at a previous time and/or a substantially similar time as anomaly 150. Software defect detection tool 125 uses this information to identify defect 152.

Software defect detection tool 125 may determine whether it can automatically fix defect 152. For example, software defect tool 125 may determine that it can restart the execution of software code 142 to automatically fix the error. If software defect detection tool 125 may automatically fix the error, software defect detection tool 125 generates auto fix 156 to fix the error. Auto fix 156 is a command to perform an operation to fix defect 152. For example, auto fix 156 may be a command to restart the execution of software code 142.

Software defect detection tool 125 may communicate alert 154 to a software developer or any other suitable person. Alert 154 identifies defect 152. A software developer may remove defect 152 in response to alert 154. In some embodiments, software defect detection tool 125 automatically categorizes defect 152 and communicates defect 152 to software defect analysis tool 158. In some embodiments, a software defect detection tool communicates defect 152 to a software developer for categorization before defect 152 is communicated to software defect analysis tool 158.

Software defect analysis tool 158 categorizes defect 152, determines whether defect 152 is a false positive, and generates corrective action plan 180. As illustrated in FIG. 1, software defect analysis tool 158 includes a processor 160 and memory 162. This disclosure contemplates processor 160 and memory 162 being configured to perform any of the operations of software defect analysis tool 158 described herein. In particular embodiments, software defect analysis tool 158 reduces or eliminates coding errors in software development.

Processor 160 is any electronic circuitry, including, but not limited to microprocessors, application specific integrated circuits (ASIC), application specific instruction set processor (ASIP), and/or state machines, that communicatively couples to memory 162 and controls the operation of software defect analysis tool 158. Processor 160 may be 8-bit, 16-bit, 32-bit, 64-bit or of any other suitable architecture. Processor 160 may include an arithmetic logic unit (ALU) for performing arithmetic and logic operations, processor registers that supply operands to the ALU and store the results of ALU operations, and a control unit that fetches instructions from memory 162 and executes them by directing the coordinated operations of the ALU, registers and other components. Processor 160 may include other hardware and software that operates to control and process information. Processor 160 executes software stored on memory 162 to perform any of the functions described herein. Processor 160 controls the operation and administration of software defect analysis tool 158 by processing information received from network 115, device(s) 110, and memory 162. Processor 160 may be a programmable logic device, a microcontroller, a microprocessor, any suitable processing device, or any suitable combination of the preceding. Processor 160 is not limited to a single processing device and may encompass multiple processing devices.

Memory 162 may store, either permanently or temporarily, data, operational software, or other information for processor 160. Memory 162 may include any one or a combination of volatile or non-volatile local or remote devices suitable for storing information. For example, memory 162 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in memory 162, a disk, a CD, or a flash drive. In particular embodiments, the software may include an application executable by processor 160 to perform one or more of the functions described herein. In particular embodiments, memory 162 may store approved combinations 176, false positive combinations 178, and/or any other suitable information to facilitate the operation of software defect analysis tool 158. This disclosure contemplates memory 162 storing any of the elements stored in devices 110, memory 135, and/or any other suitable component of system 100.

In an exemplary embodiment, software defect analysis tool 158 receives defect information 164. Software defect analysis tool 158 may receive defect information 164 from software defect detection tool 125, one or more users 105 via devices 110, or any other suitable component of system 100. Defect information 164 may include defect 152 and information associated with defect 152. Defect information 164 includes defect cause 166, defect category 168, developer 172, and root cause 174. Software defect analysis tool 158 parses defect information 164 to determine defect cause 166, defect category 168, developer 172, and root cause 174.

Defect cause 166 indicates a cause of defect 152. Software defect detection tool 125 may determine defect cause 166. In some embodiments, one or more software developers determine defect cause 166. Defect cause 166 may be one or more of incorrect coding, existing production issue, performance, working as designed, incorrect data setup, user input error, migration issue, performance tuning, non-SAP system, SAP system, unable to reproduce, and out of scope.

Defect category 168 indicates a category of defect 152. Software defect detection tool 125 may automatically determine defect category 168. In some embodiments, one or more users 105 determine defect category 168. Defect category may be one or more of configuration, data, deployment, development, operations, and requirements.

Developer 172 generally indicates one or more software developers 172 responsible for software code 142. For example, developer 172 may indicate a code developer that generated software code 142. As another example, developer 172 may indicate a team of developers that generated software code 142. As yet another example, developer 172 may indicate a developer or team of developers responsible for maintaining software code 142. Developer 172 may be a subset of users 105. Developer 172 may be the same as users 105. In some embodiments, developer 172 identifies defect cause 166 and/or defect category 168.

Root cause 174 indicates a real-world reason for defect 152. Root cause 174 may be used to facilitate generating corrective action plan 180. Software defect analysis tool 158 may generate root cause 174 using defect cause 166 and/or defect category 168. As another example, software defect detection tool 125 may identify root cause 174. As yet another example, developer 172 may determine root cause 174. Root cause 174 may be one or more of oversight, missed test scenario, improper understand, and ignorance.

Software defect analysis tool 158 generates cause/category combination 170 using defect cause 166 and defect category 168. Software defect analysis tool 158 aggregates defect cause 166 and defect category 168 to generate cause/category combination 170. For example, if defect category 168 defect 152 is configuration and defect cause 168 for defect 152 is coded incorrectly, cause/category combination 170 may be coded incorrectly/configuration.

Software defect analysis tool 158 compares cause/category combination 170 to a predetermined list of approved cause/category combinations 176 to determine whether it is an approved combination. For example, if cause/category combination 170 matches one or more approved cause/category combinations 176, software defect analysis tool 158 determines that cause/category combination 170 is an approved combination. If software defect analytics tool 158 determines that cause/category combination 170 is not an approved combination, software defect analysis tool 158 may communicate defect information 164 and/or defect 152 to developer 172 to reclassify defect 152. For example, defect 152 may be reclassified by modifying defect cause 166 and/or defect category 168

Software defect analysis tool 158 determines whether defect 152 is a false positive by comparing cause/category combination 170 to false positive combinations 178. False positive combinations 178 is a list of false positive cause/category combinations. A false positive indicates that defect 152 is not an error in software code 142. Software defect analysis tool 158 may include a predetermined list of false positive combinations 178. For example, the predetermined list may include working as designed/configuration, data setup incorrect/data, user input error/data, working as designed/development, unable to reproduce/operations, requirement out of scope/requirements, and/or working as designed/requirements cause/category combinations. Software defect analysis tool 158 may receive false positive combinations 178 from devices 110 and/or any other suitable component of system 100. If software defect analysis tool 158 determines that cause/category combination 170 is included in a predetermined list of false positive, then software defect analysis tool 158 determines that defect 152 is a false positive.

Software defect analysis tool 158 generates corrective action plan 180. Corrective action plan 180 indicates measures to implement to reduce software defects. Software defect analysis tool 158 may use cause/category combination 170 and/or root cause 174 to develop corrective action plan 180. For example if root cause 174 is oversight, corrective action plan may generate a review checklist and/or employ automated code review. As another example, if root cause is improper understanding, correction action plan 180 may indicate to provide working sessions to provide information on the granular requirements of generating software code 142. As yet another example, if root cause 174 is ignorance, corrective action plan 180 may indicate to provide review check lists. Software defect analysis tool 158 may communicate corrective action plan 180 to developer 172, users 105, and/or any other suitable person.

Modifications, additions, or omissions may be made to system 100 without departing from the scope of the invention. For example, system 100 may include any number of processors 130/160, memory 135/162, and/or devices 110. System 100 may not include software defect detection tool 125. In another example, system 100 may not include software defect analysis tool 158. As a further example, software defect detection tool 125 and software defect analysis tool 158 may be combined to form a single tool.

Figure 2:
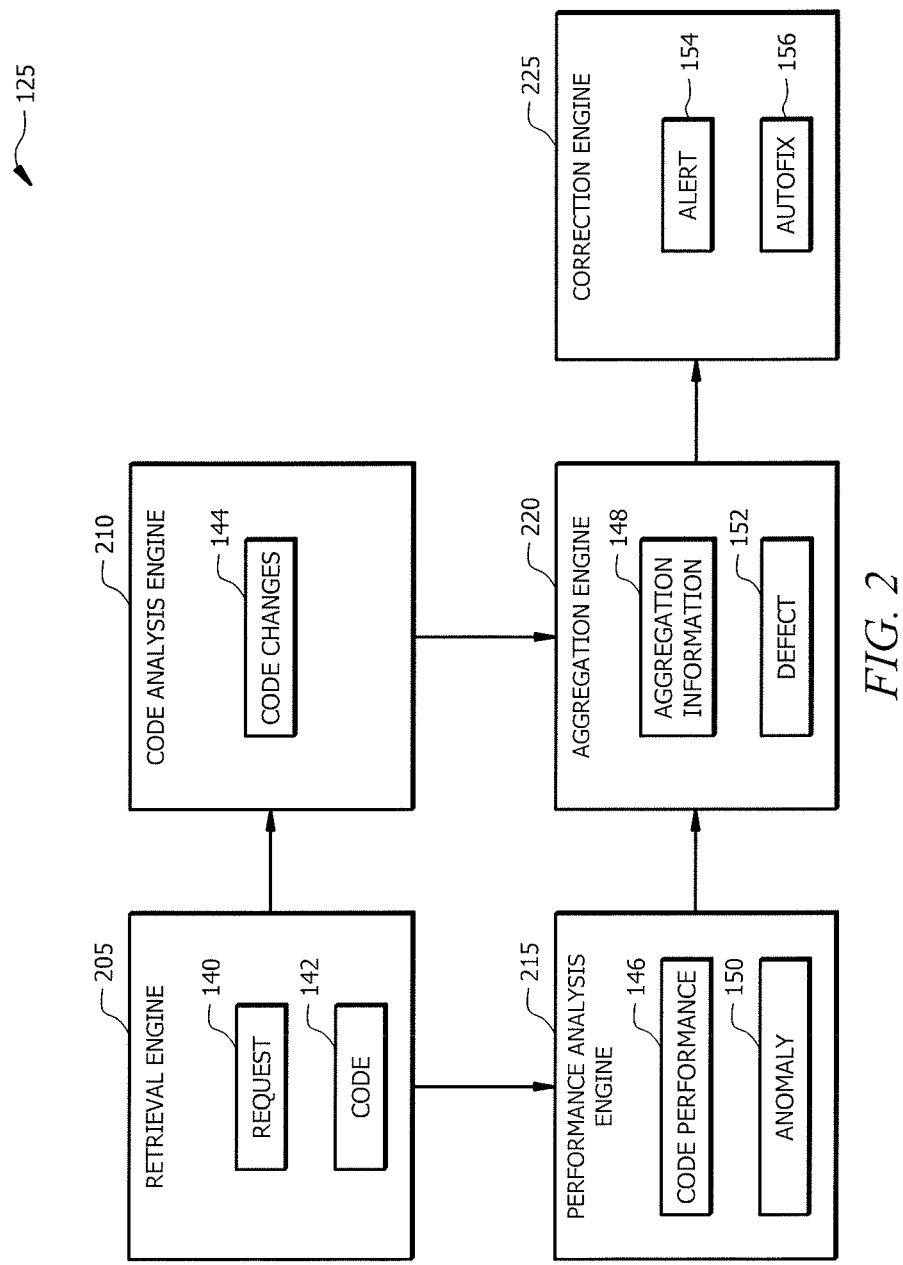
FIG. 2 illustrates the software defect detection tool of the system of FIG. 1.

FIG. 2 illustrates the software defect detection tool 125 of the system 100 of FIG. 1. As illustrated in FIG. 2, software defect detection tool 125 includes retrieval engine 200, code analysis engine 210, performance analysis engine 215, aggregation engine 220, and correction engine 225. In particular embodiments, software defect detection tool 125 reduces or eliminates errors in software development.

Retrieval engine 200 receives request 140 retrieves and software code 142 based on request 140. In particular embodiments, retrieval engine 200 receives request 140 from one or more devices 110. An example algorithm for retrieval engine 200 is as follows: wait for request 140; receive request 140 from one or more devices 110; in response to receiving request 140, retrieve software code 142; and communicate request 140 and software code 142 to code analysis engine 210 and performance analysis engine 215. In an embodiment, request 140 includes software code 142.

Code analysis engine 210 receives request 140 and software code 142 and generates code changes 144. Code analysis engine 210 may compare software code 142 to a previous version of software code 142 to determine changes. Code analysis engine 210 may dynamically receive updates to software code 142 and compare software code 142 to previous versions of software code 142. Code changes 144 generally indicate a type of software change and a time at which software code 142 was modified. An example algorithm for retrieval engine 200 to generate code changes 144 is as follows: receive software code 142; compare software code 142 to a previous version of software code 142; determine changes in software code 142 from the previous version of software code 142; determine a time that the changes occurred; and communicate code changes 144 to aggregation engine 220.

Performance analysis engine 215 receives software code 142 and generates code performance 146 and anomaly 105. Performance analysis engine 215 may execute software code 142 to determine code performance 146. As another example, performance engine 215 may receive information from a computing machine that is executing software code 142 to generate code performance 146. In some embodiments, performance analysis engine 215 generates code performance 146 in real time as software code 142 is executed. Performance analysis engine 215 may detect anomaly 150 using code performance 146 as previously discussed. Performance analysis engine 215 determines a time that anomaly 150 occurred. As previously discussed, anomaly 150 indicates a performance issue with software code 142. For example, if anomaly 150 is that CPU usage exceeded a predetermined amount, perform lance analysis engine 215 determines a time that the CPU usage exceeded the predetermined amount. In some embodiments, performance analysis engine 215 may only generate code performance 146 for a subset of software code 142. For example, software defect detection tool 125 may determine that only a portion of software code 142 was modified and/or is relevant. Performance analysis engine may only determine code performance 146 for this subset of software code 142. Performance analysis engine 215 communicates anomaly 150 to aggregation engine 220. An example algorithm for performance analysis engine 215 generating code performance 146 and anomaly 150 is as follows: receive software code 142 from retrieval engine 205; generate code performance 146 using software code 142; determine anomaly 150 using code performance 146; and communicate anomaly 150 to aggregation engine 220.

Aggregation engine 220 uses code changes 144 and anomaly 150 to determine defect 152. Anomaly 150 indicates a defect and a time that the defect occurred. Code changes 144 indicates a time that a code change occurred. Aggregation engine 220 aggregates code changes 144 and anomaly 150 to generate aggregation information 148. Aggregation information 148 places code changes 144 and anomaly 150 on a timeline. Aggregation engine 220 may then determine defect 152 by comparing the time anomaly 150 occurred to times of code changes 144. For example, if a code change 144 occurred just before anomaly 150, aggregation engine 220 may determine that the code change 144 caused anomaly 150. Aggregation engine 220 may parse the code change 144 to determine defect 152. Aggregation engine 220 communicates defect 152 to correction engine 225. An example algorithm for aggregation engine 220 to generate defect 152 is as follows: receive code changes 144 and code performance 146. Aggregate code changes 144 and code performance 146 to generate aggregation information 148; determine defect 152 using aggregation information 148; and communicate defect 152 to correction engine 225. In some embodiments, aggregation engine 220 generates cause/category combination 170 and communicates cause/category combination 170 to software defect analysis tool 158. Correction engine 225 receives defect 152 and facilitates generating alert 154 and/or generating auto-fix 156. Correction engine 225 receives defect 152 and determines whether defect 152 may be automatically corrected. For example, correction engine 225 may determine software code 142 may be restarted. Correction engine 225 may determine that software code may be automatically corrected by comparing defect 152 to predetermined types of defects that may be automatically corrected. Correction engine 225 may generate auto fix 156 upon a determination that defect 152 may be automatically corrected. Auto fix 156 facilitates corrected error 156. In some embodiments, auto fix 156 includes a command to restart execution of software code 142. Correction engine 156 may communicate auto fix 156 to a computing machine that is executing software code 142. Correction engine 225 may communicate alert 154 to developer 172 and/or any other suitable person. Alert 154 includes defect 152. An example algorithm for correction engine 225 is as follows: receive defect 152; determine whether defect 152 may be automatically correct; generate auto fix 156 to automatically correct defect 152; generate alert 154; and communicate alert 154.

Modifications, additions, or omissions may be made to software defect detection tool 125 without departing from the scope of the invention. For example, software defect detection tool 125 may not include correction engine 225. Software defect detection tool 125 may include some, none, or all of the engines illustrated in FIG. 2. As another example, software defect detection tool 125 may include additional engines.

Figure 3:
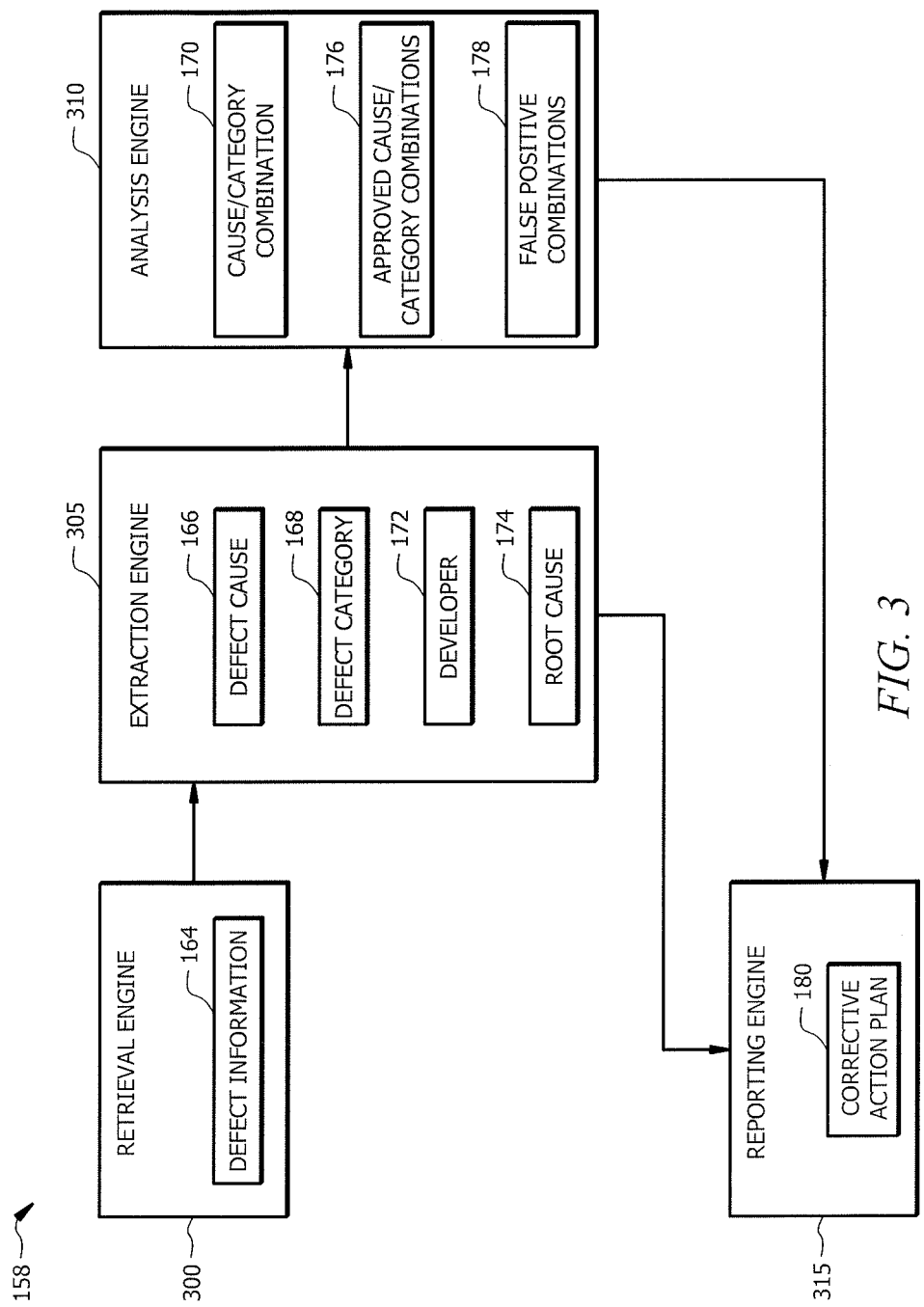
FIG. 3 illustrates the software defect analysis tool of the system of FIG. 1.

FIG. 3 illustrates the software defect analysis tool 158 of the system 100 of FIG. 1. As illustrated in FIG. 3, software defect analysis tool 158 includes retrieval engine 300, extraction engine 305, analysis engine 170, and reporting engine 180. Software defect analysis tool 158 reduces or eliminates errors in software code development.

Retrieval engine 200 receives defect information 164 for defect 152. In particular embodiments, retrieval engine 200 receives defect information 164 from one or more devices 110. Retrieval engine 200 may receive defect information 164 from software defect detection tool 125. In some embodiments, retrieval engine 300 includes a network interface. Defect information 164 is information for a defect in software code 142. Defect information 164 may include defect cause 166 indicating a cause of defect 152. For example, defect cause may be one of a coded incorrectly cause, an existing production issue cause, a performance cause, a data setup incorrect cause, a user input error cause, and a migration issue cause. Defect information may include defect category 168 indicating that defect 152 is one of a plurality of defect categories. For example, defect 152 may be one of a configuration category, a data category, a deployment category, an operations category, and a requirements category. Defect information 164 may include developer 172 indicating one or more developers of software code 142. Defect information 164 may include root cause 174 that indicates a root cause of the defect. Root cause 174 is selected from a list including oversight, missed test scenario, improper understanding, and ignorance. An example algorithm for retrieval engine 200 is as follows: wait for defect information 164; receive defect information 164 from one or more devices 110; and communicate defect information 164 and to extraction engine 305.

Extraction engine 305 extracts information from defect information 164 to determine defect cause 166, defect category 168, developer 172, and root cause 174. For example, extraction engine 305 parses defect information 164 to extract defect cause 166, defect category 168, developer 172, and root cause 174 from defect information 164. Extraction engine communicates defect cause 166, defect category 168, developer 172, and root cause 174 from defect information 164 to analysis engine 310 and/or reporting engine 315. An example algorithm for extraction engine 305 extracting information from defect information 164 is as follows: receive defect information 164 from retrieval engine 164; extract defect cause 166, defect category 168, developer 172, and root cause 174 from defect information 164; and communicate defect cause 166, defect category 168, developer 172, and root cause 174 from to analysis engine 310 and reporting engine 315.

Analysis engine 310 generates cause/category combination 170, determines whether cause/category combination 170 is an approved cause/category combination, and determines whether defect 152 is a false positive. Analysis engine 310 receives defect cause 166 and defect category 168 from extraction engine 305. Analysis engine 310 aggregates defect cause 166 and defect category 168 to generation cause/category combination 170. An example algorithm for analysis engine 310 to generate cause/category combination 170 is as follows: receive defect cause 166; receive defect category 168; aggregate defect cause 166 and defect category 168 to generate cause/category combination 170.

Analysis engine 310 determines whether cause/category combination 170 is an approved cause/category combination by comparing cause/category combination 170 to approved cause/category combinations 176. Approved cause/category combinations 176 are predetermined approved cause/category combinations. Analysis engine 310 may receive a list of approved cause/category combinations 176 from devices 110 and/or any other suitable component of system 100. In some embodiments, analysis engine may update approved cause/category combinations 176 upon receipt of new approved cause/category combinations. For example, retrieval engine 164 may receive one or more additional approved cause/category combinations from devices 110. Analysis engine 310 may receive the one or more additional approved cause/category combinations from retrieval engine 300 and save the additional approved cause/category combinations, along with the previous approved cause/category combinations, as approved cause/category combinations 176. User 105 may add, delete, and/or modify approved cause/category combinations 176 using devices 110. Analysis engine 300 determines whether cause/category combination 170 is an approved cause/category by comparing cause/category combination 170 to approved cause/category combinations 176. If analysis engine 170 determines that cause/category combination 170 is not an approved cause/category combination, it may communicate cause/category combination, defect 152, and/or defect information to developer 172 for classification. For example, analysis engine 310 may communicate a request to developer 172 to update at least one of the defect cause 166 and the defect category 168 of the defect 152. An example algorithm for analysis engine 310 to determine whether cause/category combination 170 is an approved cause/category combination is as follows: compare the generated cause/category combination 170 to approved cause/category combinations 176 to determine if cause/category combination 170 matches one or more of the approved cause/category combinations 176.

Analysis engine 310 determines whether defect 152 is a false positive. Analysis engine makes this determination by comparing cause/category combination 170 to false positive combinations 178. False positive combinations 178 is a list of predetermined cause/category combinations that are false positive. Analysis engine 310 may receive false positive combinations 178 from devices 110, software defect detection tool 125, and/or any other suitable component of system 100. User 105 may determine that particular cause/category combinations are not software defects and communicate the cause/category combinations to analysis engine 31. Example of false positive combinations 178 include the working as designed/configuration, data setup incorrect/data, user input error/data, working as designed/development, unable to reproduce/operations/requirement out of scope/requirements, and/or working as designed requirements may be a false positive combination 178. Analysis engine 310 determines if cause/category combination 170 matches one or more false positive combinations 178 to determine whether defect 152 is a false positive. An example algorithm for analysis engine 310 determining whether defect 152 is a false positive is as follows: generate cause/category combination 170; compare cause/category combination 170 to false positive combinations 178; and determine whether cause/category combination matches one or more false positive combinations 178.

Reporting engine 315 receives developer 172, root cause 174, and/or cause/category combination 170 and generates corrective action plan 180. Corrective action plan 180 indicates measures to implement to reduce software defects. Corrective action plan 180 may identify error 152 and the defect cause 166 and defect category 168 of error 152. Each cause/category combination 170 may be linked to one or more recommendations. Reporting engine may receive the recommendations from, e.g., devices 110. Reporting engine 315 may include the recommendations in corrective action plan 180. In some embodiments, corrective action plan 180 includes root cause 174. Root cause 174 may be linked to one or more recommendations that is included in corrective action plan 180. In some embodiments, reporting engine 315 receives information for a plurality of defects 152. Analysis engine 310 generates a cause/category combination 170 for each of the defects as previously discussed. Reporting engine may sort the plurality of defects 152 by cause/category combination 170 and include the sorted list of defects 152 in correction active plan 180. As another example, reporting engine 315 may determine a percentage of defects that are a specific cause/category combination and include the percentage in corrective action plan 180. An example algorithm for reporting engine 315 to generating corrective action plan 180 is as follows: receive defect information 164 from extraction engine 3015; receive cause/category combination 170 from analysis engine 310; and generate corrective action plan 180 based on at least part of defect cause information 164 and cause/category combination 170.

Modifications, additions, or omissions may be made to software defect analysis tool 158 without departing from the scope of the invention. For example, software defect analysis tool 158 may include some, none, or all of the engines illustrated in FIG. 3. As another example, software defect analysis tool 158 may include additional engines.

Figure 4:
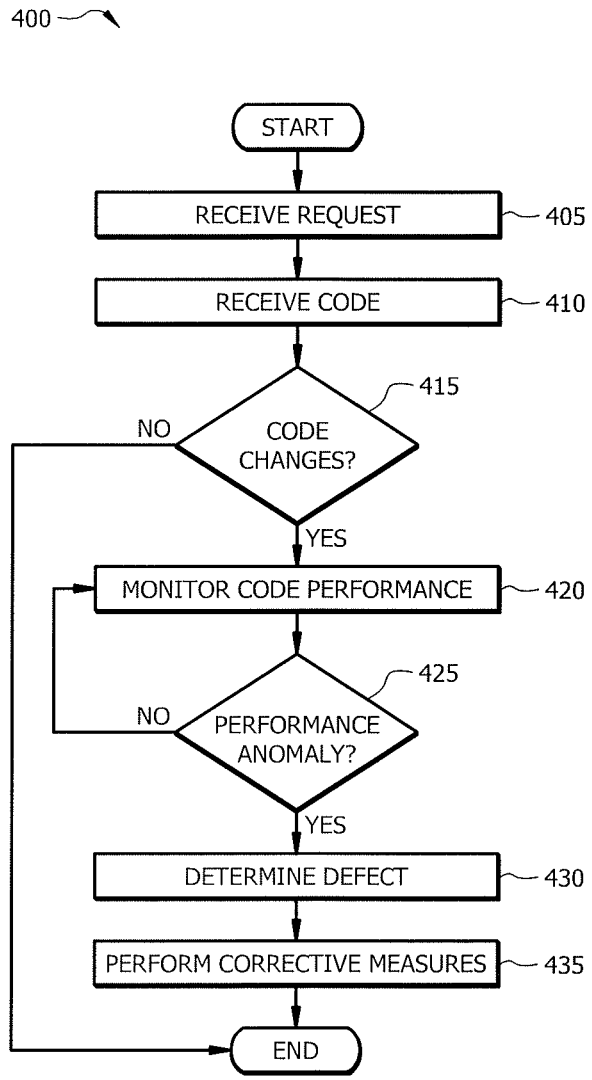
FIG. 4 is a flowchart illustrating a method for software defect detection using the system of FIG. 1.

FIG. 4 is a flowchart illustrating a method 400 for software defect detection using system 100. In particular embodiments, software defect detection tool 125 performs method 300. By performing method 300, software defect detection tool 125 reduces or eliminates coding errors in software development.

The method begins at step 405 where software defect detection tool 125 receives request 140 to determine one or more errors 152. In step 410, software defect detection tool 125 retrieves software code 142 in response to request 140. Software defect detection tool 125 determines there are any code changes 144 in step 415. For example, software defect detection tool 125 compares software code 142 to a previous version of software code 142. If software defect detection tool 125 does not determine a code change 144 at step 415, the method ends. Otherwise, the method proceeds to step 420.

At step 420, software defect detection tool 125 monitors code performance 146. As discussed, software code 142 is executed and software defect detection tool 125 monitors the execution of software code 142 to determine code performance 146. Software defect detection tool 125 determines whether there is an anomaly 150 at step 425. As previously discussed, anomaly 150 may indicate a performance issue with the execution of software code 142. If software defect detection tool 125 does not detect anomaly 150, the method proceeds to step 420, where software defect detection tool 125 continues to monitor code performance 146.

If software defect detection tool 125 does detect anomaly 150 at step 425, the method proceeds to step 430 where software defect detection tool 125 determines defect 152. Software defect detection tool 125 may compare a time at which anomaly occurred with a time of code changes 144. If software defect detection tool 125 determines that a code change 144 occurred at the same time or substantially the same time as anomaly 150 was detected, software defect detection tool 125 may determine that the code change 144 caused the anomaly and may determine defect 430 based on the code change 144. Next the method proceeds to step 435 where software defect detection tool 125 pertains corrective actions. For example, software defect detection tool 125 may generate alert 154 or auto-fix 156, as previously discussed.

Modifications, additions, or omissions may be made to method 400 depicted in FIG. 4. Method 400 may include more, fewer, or other steps. For example, steps may be performed in parallel or in any suitable order. While discussed as software defect detection tool 125 performing the steps, any suitable component of system 100, such as device(s) 110 and/or software defect analysis tool 158, for example, may perform one or more steps of the method.

Figure 5:
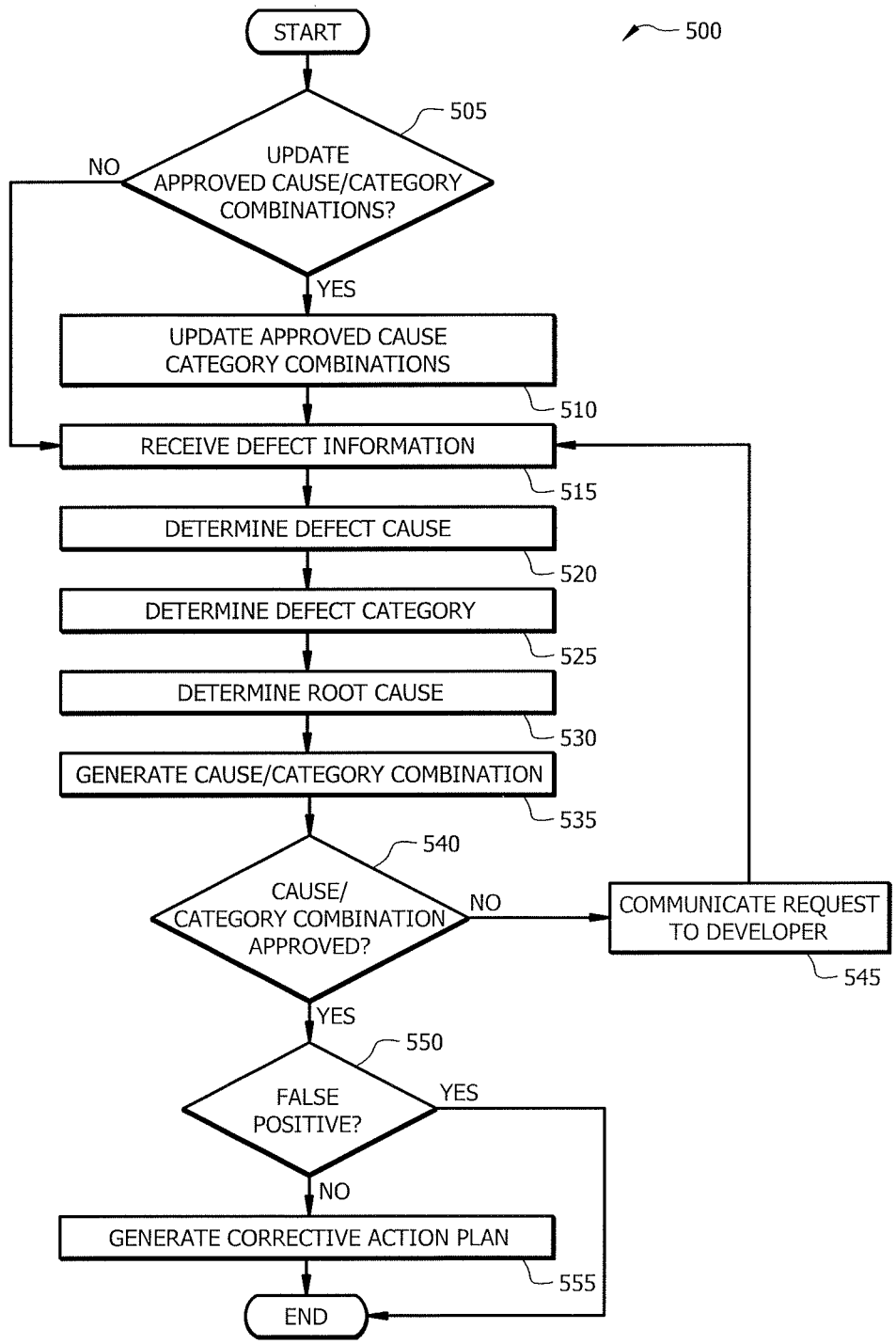
FIG. 5 is a flowchart illustrating a method for software defect analysis using the system of FIG. 1.

FIG. 5 is a flowchart illustrating a method 500 for software defect analysis using system 100. In particular embodiments, software defect analysis tool 158 performs method 500. By performing method 500, software defect analysis tool 158 reduces or eliminates coding errors in software development.

The method begins at step 505 software defect analysis tool 158 determines whether it receives updated approved cause/category combinations. If software defect analysis tool 158 does receive updated approved cause/category combinations at step 505, software defect analysis tool 158 updates approved cause/category combinations 176 at step 510. Otherwise the method proceeds to step 515 where software defect analysis tool 158 receives defect information 164.

Software defect analysis tool 158 determines defect cause 166, defect category 168, and root cause 174 at steps 520, 525, and 530 respectively. As discussed software defect analysis tool 158 extracts defect cause 166, defect category 168, and root cause 174 from defect information 164. In step 535, software defect analysis tool 158 generates cause/category combination 170 by aggregating defect cause 166 and defect category 168.

Software defect analysis tool 158 determines whether cause/category combination 170 is an approved cause/category combination in step 540. As previously discussed, software defect analysis tool 158 compares cause/category combination 170 to approved cause/category combinations 176 to determine whether it is approved. If cause/category combination is not approved, software defect analysis tool 158 communicates a request to developer 172 to revise at least one of defect cause 166 and defect category 168 before proceeding to step 515.

If software defect analysis tool 158 determines that cause/category combination 170 is an approved combination at step 540, the method proceeds to step 550 where software defect analysis tool 158 determines whether defect 152 is a false positive. As described previously, software defect analysis tool 158 determines whether defect 152 is a false positive by comparing cause/category combination 170 to false positive combinations 178. If software defect analysis tool 158 determines that defect 152 is a false positive, the method ends. If software defect analysis tool 158 determines that defect 152 is not a false positive, the method proceeds to step 555 where software defect analysis tool 158 generates correction action plan 180 as previously discussed before the method ends.

Modifications, additions, or omissions may be made to method 500 depicted in FIG. 5. Method 500 may include more, fewer, or other steps. For example, steps may be performed in parallel or in any suitable order. While discussed as software defect analysis tool 158 performing the steps, any suitable component of system 100, such as device(s) 110 and/or software defect detection tool 125, for example, may perform one or more steps of the method. As another example, corrective action plan 555 may include information for any number of defects 152. In this example, software defect analysis tool 158 may perform method 500 any suitable number of times. In this example, software defect analysis tool may perform step 555 a single time while performing the rest of method 500 a plurality of times for each defect 152.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A software defect analysis tool comprising:
   a network interface configured to receive defect information for a defect in a software code, the defect information comprising:
   a defect category indicating that the defect is one of a plurality of defect categories;
   a defect cause indicating a cause of the defect; and
   developer information indicating a developer of the software code;
   an extraction engine configured to;
   determine the defect cause;
   determine the defect category; and
   determine the developer;
   an analysis engine
   generate a cause/category combination, the cause/category combination comprising the defect cause and the defect category;
   determine whether the cause/category combination is an approved cause/category combination by comparing the cause/category combination to a plurality of predetermined approved cause/category combinations; and
   upon a determination that the cause/category combination is not an approved cause/category combination, communicate a request to the developer to update at least one of the defect cause and the defect category;
   a reporting engine implemented by a hardware processor, the reporting engine configured to generate a corrective action plan, the corrective action plan indicating measures to implement to reduce software defects; and
   a retrieval engine implemented by the hardware processor, the retrieval engine configured to:
   receive a new approved cause/category combination, wherein the analysis engine is further configured to update the predetermined approved cause/category combinations to include the new approved cause/category combination; and
   receive defect information for a plurality of defects, the defect information comprising root cause information indicating a root cause of the defect, wherein the root cause is selected from one of a list comprising oversight, missed test scenario, improper understanding, and ignorance, wherein the reporting engine is further configured to sort the plurality of defects by cause/category combination, determine a percentage of defects of each cause/category combination, and include the percentage and the root cause in the corrective action plan.

2. The software defect analysis tool of claim 1, wherein the analysis engine is further configured to:
   upon a determination that the cause/category combination is an approved cause/category combination, determine whether the defect is a false positive, the determination based, at least in part, on the cause/category combination.

3. The software defect analysis tool of claim 1, wherein the defect category is one of a configuration category, a data category, a deployment category, an operations category, and a requirements category.

4. The software defect analysis tool of claim 1, wherein the defect cause is one of a coded incorrectly cause, an existing production issue cause, a performance cause, a data setup incorrect cause, a user input error cause, and a migration issue cause.

5. A method comprising:
receiving defect information for a defect in a software code, the defect information comprising:
a defect category indicating that the defect is one of a plurality of defect categories;
a defect cause indicating a cause of the defect; and
developer information indicating a developer of the software code;
determining the defect cause;
determining the defect category;
determining the developer;
generating a cause/category combination, the cause/category combination comprising the defect cause and the defect category;
determining whether the cause/category combination is an approved cause/category combination by comparing the cause/category combination to a plurality of predetermined approved cause/category combinations; and
upon a determination that the cause/category combination is not an approved cause/category combination, communicating a request to the developer to update at least one of the defect cause and the defect category;
generating a corrective action plan, the corrective action plan indicating measures to implement to reduce software defects; and
receiving a new approved cause/category combination;
updating the predetermined approved cause/category combinations to include the new approved cause/category combination;
receiving defect information for a plurality of defects, the defect information comprising root cause information indicating a root cause of the defect, wherein the root cause is selected from one of a list comprising oversight, missed test scenario, improper understanding, and ignorance;
sorting the plurality of defects by cause/category combination;
determining a percentage of defects of each cause/category combination; and
including the percentage and the root cause in the corrective action plan.

6. The method of claim 5, further comprising:
upon a determination that the cause/category combination is an approved cause/category combination, determining whether the defect is a false positive, the determination based, at least in part, on the cause/category combination.

7. The method of claim 5, wherein the defect category is one of a configuration category, a data category, a deployment category, an operations category, and a requirements category.

8. The method of claim 5, wherein the defect cause is one of a coded incorrectly cause, an existing production issue cause, a performance cause, a data setup incorrect cause, a user input error cause, and a migration issue cause.

9. A system comprising:
a user device; and
a software defect analysis tool comprising a hardware processor configured to:
receive defect information for a defect in a software code, the defect information comprising:
a defect category indicating that the defect is one of a plurality of defect categories;
a defect cause indicating a cause of the defect; and
developer information indicating a developer of the software code;
determine the defect cause;
determine the defect category;
determine the developer;
generate a cause/category combination, the cause/category combination comprising the defect cause and the defect category;
determine whether the cause/category combination is an approved cause/category combination by comparing the cause/category combination to a plurality of predetermined approved cause/category combinations; and
upon a determination that the cause/category combination is not an approved cause/category combination, communicate a request to the developer to update at least one of the defect cause and the defect category;
generate a corrective action plan, the corrective action plan indicating measures to implement to reduce software defects;
receive a new approved cause/category combination, wherein the analysis engine if further configured to update the predetermined approved cause/category combinations to include the new approved cause/category combination; and
receive defect information for a plurality of defects, the defect information comprising root cause information indicating a root cause of the defect, wherein the root cause is selected from one of a list comprising oversight, missed test scenario, improper understanding, and ignorance, wherein the reporting engine is further configured to sort the plurality of defects by cause/category combination, determine a percentage of defects of each cause/category combination, and include the percentage and the root cause in the corrective action plan.

10. The system claim 9, wherein the software defect analysis tool is further configured to:
upon a determination that the cause/category combination is an approved cause/category combination, determine whether the defect is a false positive, the determination based, at least in part, on the cause/category combination.

11. The system claim 9, wherein the defect category is one of a configuration category, a data category, a deployment category, an operations category, and a requirements category.

12. The system claim 9, wherein the defect cause is one of a coded incorrectly cause, an existing production issue cause, a performance cause, a data setup incorrect cause, a user input error cause, and a migration issue cause.

* * * * *